(12) United States Patent
Anderson

(10) Patent No.: US 8,635,015 B2
(45) Date of Patent: Jan. 21, 2014

(54) ENHANCED VISUAL LANDMARK FOR LOCALIZATION

(75) Inventor: Noel Wayne Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 292 days.

(21) Appl. No.: 12/640,953

(22) Filed: Dec. 17, 2009

(65) Prior Publication Data
US 2011/0153072 A1 Jun. 23, 2011

(51) Int. Cl.
G01C 21/00 (2006.01)

(52) U.S. Cl.
USPC .............................. 701/400; 701/1; 701/514

(58) Field of Classification Search
USPC ................. 701/50; 340/988; 700/245–259
See application file for complete search history.

(56) References Cited

U.S. PATENT DOCUMENTS

| | | | |
|---|---|---|---|
| 3,789,198 A | 1/1974 | Henson et al. | |
| 4,647,784 A * | 3/1987 | Stephens | 250/559.3 |
| 4,674,048 A | 6/1987 | Okumura | |
| 4,700,301 A * | 10/1987 | Dyke | 701/25 |
| 4,818,107 A * | 4/1989 | Ono et al. | 356/622 |
| 4,823,138 A * | 4/1989 | Shibano et al. | 342/457 |
| 4,918,607 A * | 4/1990 | Wible | 701/23 |
| 5,005,128 A * | 4/1991 | Robins et al. | 701/23 |
| 5,016,173 A | 5/1991 | Kenet et al. | |
| 5,050,771 A * | 9/1991 | Hanson et al. | 222/1 |
| 5,051,906 A | 9/1991 | Evans, Jr. et al. | |
| 5,086,396 A | 2/1992 | Waruszewski, Jr. | |
| 5,109,340 A | 4/1992 | Kanayama | |
| 5,144,685 A | 9/1992 | Nasar et al. | |
| 5,477,459 A * | 12/1995 | Clegg et al. | 701/300 |
| 5,585,626 A * | 12/1996 | Beck et al. | 250/222.1 |
| 5,684,476 A * | 11/1997 | Anderson | 340/988 |
| 5,731,766 A * | 3/1998 | Akamatsu | 340/988 |
| 5,802,201 A | 9/1998 | Nayar et al. | |
| 5,850,469 A | 12/1998 | Martin et al. | |
| 5,892,462 A | 4/1999 | Tran | |
| 5,911,669 A | 6/1999 | Stentz et al. | |
| 5,963,663 A | 10/1999 | Tani | |
| 5,995,902 A | 11/1999 | Monson | |
| 6,021,374 A | 2/2000 | Wood | |
| 6,085,147 A | 7/2000 | Myers | |
| 6,112,144 A * | 8/2000 | Allen | 701/50 |
| 6,191,813 B1 | 2/2001 | Fujisaki et al. | |
| 6,237,504 B1 * | 5/2001 | Tanahashi et al. | 104/243 |
| 6,255,793 B1 | 7/2001 | Peless et al. | |

(Continued)

FOREIGN PATENT DOCUMENTS

EP 2336801 A2 6/2011

OTHER PUBLICATIONS

Kiriy, "A Localization System for Autonomous Golf Course Mowers", McGill University Thesis for Electrical and Computer Engineering, Nov. 2002, pp. 1-122 www.cim.mcgill.ca/~kiriy/publications/MSthesisEK.pdf.
U.S. Appl. No. 12/640,937, filed Dec. 17, 2009, Anderson.

(Continued)

Primary Examiner — Bhavesh V Amin
(74) Attorney, Agent, or Firm — Yee & Associates, P.C.

(57) ABSTRACT

The different illustrative embodiments provide a localization apparatus comprising an identification signal and an orientation controller. The identification signal is for recognition by a localized machine for utilizing the localization apparatus as a location point. The orientation controller is configured to control an orientation of the identification signal dependent upon an orientation of the localization apparatus in a defined environment.

16 Claims, 7 Drawing Sheets

(56) References Cited

U.S. PATENT DOCUMENTS

| | | | |
|---|---|---|---|
| 6,317,690 B1 | 11/2001 | Gia | |
| 6,336,051 B1 | 1/2002 | Pangels et al. | |
| 6,370,453 B2 | 4/2002 | Sommer | |
| 6,374,048 B1 | 4/2002 | Uenaka et al. | |
| 6,401,038 B2 | 6/2002 | Gia | |
| 6,459,989 B1 * | 10/2002 | Kirkpatrick et al. | 701/215 |
| 6,539,303 B2 * | 3/2003 | McClure et al. | 701/213 |
| 6,556,598 B1 * | 4/2003 | Angott | 372/9 |
| 6,584,390 B2 | 6/2003 | Beck | |
| 6,615,570 B2 | 9/2003 | Beck et al. | |
| 6,678,588 B2 | 1/2004 | He | |
| 6,684,130 B2 | 1/2004 | Ogure et al. | |
| 6,700,482 B2 | 3/2004 | Ververs et al. | |
| 6,748,325 B1 | 6/2004 | Fujisaki | |
| 6,807,478 B2 * | 10/2004 | Giannopoulos et al. | 701/207 |
| 6,868,307 B2 | 3/2005 | Song et al. | |
| 6,907,336 B2 | 6/2005 | Gray et al. | |
| 6,934,615 B2 | 8/2005 | Flann et al. | |
| 6,963,800 B1 | 11/2005 | Milbert | |
| 6,984,952 B2 | 1/2006 | Peless et al. | |
| 6,985,620 B2 | 1/2006 | Sawhney et al. | |
| 7,024,842 B2 | 4/2006 | Hunt et al. | |
| 7,079,943 B2 | 7/2006 | Flann et al. | |
| 7,110,881 B2 | 9/2006 | Gray et al. | |
| 7,142,956 B2 * | 11/2006 | Heiniger et al. | 701/23 |
| 7,155,309 B2 | 12/2006 | Peless et al. | |
| 7,164,118 B2 | 1/2007 | Anderson et al. | |
| 7,206,063 B2 | 4/2007 | Anderson et al. | |
| 7,216,033 B2 | 5/2007 | Flann et al. | |
| 7,228,214 B2 | 6/2007 | Flann et al. | |
| 7,242,791 B2 | 7/2007 | Han et al. | |
| 7,248,952 B2 | 7/2007 | Ma et al. | |
| 7,251,346 B2 | 7/2007 | Higaki et al. | |
| 7,272,467 B2 | 9/2007 | Goncalves et al. | |
| 7,299,056 B2 | 11/2007 | Anderson | |
| 7,299,057 B2 | 11/2007 | Anderson | |
| 7,313,404 B2 | 12/2007 | Anderson | |
| 7,330,775 B2 | 2/2008 | Orita et al. | |
| 7,333,631 B2 | 2/2008 | Roh et al. | |
| 7,343,222 B2 | 3/2008 | Solomon | |
| 7,349,759 B2 | 3/2008 | Peless et al. | |
| 7,403,836 B2 | 7/2008 | Aoyama | |
| 7,429,843 B2 | 9/2008 | Jones et al. | |
| 7,447,593 B2 | 11/2008 | Estkowski et al. | |
| 7,505,848 B2 | 3/2009 | Flann et al. | |
| 7,613,544 B2 * | 11/2009 | Park et al. | 700/245 |
| 7,664,764 B2 | 2/2010 | Biacs | |
| 7,739,034 B2 | 6/2010 | Farwell | |
| 7,792,607 B2 | 9/2010 | Han et al. | |
| 7,826,969 B2 | 11/2010 | Hein et al. | |
| 7,831,094 B2 | 11/2010 | Gupta et al. | |
| 7,848,879 B2 | 12/2010 | Herman | |
| 7,916,898 B2 | 3/2011 | Anderson | |
| 8,116,950 B2 | 2/2012 | Glee | |
| 8,174,568 B2 | 5/2012 | Samarasekera et al. | |
| 8,224,516 B2 | 7/2012 | Anderson | |
| 8,265,337 B2 | 9/2012 | Yu et al. | |
| 2004/0158355 A1 | 8/2004 | Holmqvist et al. | |
| 2004/0193348 A1 * | 9/2004 | Gray et al. | 701/50 |
| 2004/0193349 A1 * | 9/2004 | Flann et al. | 701/50 |
| 2005/0075784 A1 | 4/2005 | Gray et al. | |
| 2005/0088643 A1 | 4/2005 | Anderson | |
| 2005/0171644 A1 | 8/2005 | Tani | |
| 2005/0192749 A1 | 9/2005 | Flann et al. | |
| 2005/0197757 A1 | 9/2005 | Flann et al. | |
| 2005/0197766 A1 | 9/2005 | Flann et al. | |
| 2005/0216181 A1 | 9/2005 | Estkowski et al. | |
| 2005/0216182 A1 | 9/2005 | Hussain et al. | |
| 2005/0238200 A1 | 10/2005 | Gupta et al. | |
| 2005/0251291 A1 | 11/2005 | Solomon | |
| 2006/0091297 A1 | 5/2006 | Anderson et al. | |
| 2006/0126918 A1 | 6/2006 | Oohashi et al. | |
| 2007/0192024 A1 | 8/2007 | Flann et al. | |
| 2007/0219668 A1 | 9/2007 | Takahashi et al. | |
| 2008/0059015 A1 | 3/2008 | Whittaker et al. | |
| 2008/0167814 A1 | 7/2008 | Samarasekera et al. | |
| 2008/0194270 A1 | 8/2008 | Greenberg | |
| 2008/0262718 A1 | 10/2008 | Farwell | |
| 2009/0140926 A1 | 6/2009 | Traster | |
| 2010/0087992 A1 * | 4/2010 | Glee | 701/50 |
| 2011/0153136 A1 | 6/2011 | Anderson | |
| 2011/0153338 A1 | 6/2011 | Anderson | |
| 2012/0166019 A1 | 6/2012 | Anderson | |
| 2012/0283906 A1 | 11/2012 | Anderson | |

OTHER PUBLICATIONS

U.S. Appl. No. 12/640,845, filed Dec. 17, 2009, Anderson.

European search report dated Apr. 11, 2011, regarding application No. EP10194541, reference 18885 EP Ho/VG, Applicant Deere & Company (5 PAGES).

Yuan et al., "Active exploration using scheme of autonomous distribution for landmarks," IEEE International Conference on Robotics and Automation, May 2009, pp. 4169-4174.

Rosenberg, "Boston University Partners in NSF Challenge to Create Next Generation Wireless network Using Visible Light", Boston University, Oct. 6, 2008, pp. 1-3.

"*Gradients, Linearity, and Sparsity*", Solver Advanced Tutorial—*Gradients, Linearity and Sparsity*—Frontline Systems, pp. 1-2, retrieved Oct. 16, 2009 http://www.solver.com/tutorialadv.htm.

Anderson et al., "System and Method for Area Coverage Using Sector Decomposition," U.S. Appl. No. 13/411,999, filed Mar. 5, 2012, 73 pages.

* cited by examiner

US 8,635,015 B2

ENHANCED VISUAL LANDMARK FOR LOCALIZATION

CROSS REFERENCE TO RELATED APPLICATIONS

This application is related to commonly assigned and co-pending U.S. patent application Ser. No. 12/640,845 filed on Dec. 17, 2009 and entitled "System and Method for Area Coverage Using Sector Decomposition"; U.S. patent application Ser. No. 12/650,937 filed on Dec. 17, 2009 and entitled "System and Method for Deploying Portable Landmarks" all of which are hereby incorporated by reference.

FIELD OF THE INVENTION

The present invention relates generally to systems and methods for navigation and more particularly to systems and methods for mobile robotic navigation. Still more specifically, the present disclosure relates to an enhanced visual landmark for robotic localization.

BACKGROUND OF THE INVENTION

The use of robotic devices to perform physical tasks has increased in recent years. Mobile robotic devices can be used to perform a variety of different tasks. These mobile devices may operate in semi-autonomous or fully autonomous modes. These robotic devices may have an integrated navigation system for performing a variety of different tasks in semi-autonomous or fully autonomous modes. Mobile robotic devices often rely on visual landmarks and physical perimeters for localization and navigation. Visual landmarks may operate to reflect light for detection by a robotic navigation system, but may be ineffective during low-light or no-light conditions, such as night time. Physical perimeters, such as fences or electronic boundaries of buried wire carrying a signal detectable by a robotic device, may also be used for localization and navigation. However, physical perimeters present a challenge when a sidewalk or driveway must be traversed to access a worksite, for example.

SUMMARY

The different illustrative embodiments provide a localization apparatus comprising an identification signal and an orientation controller. The identification signal is for recognition by a localized machine for utilizing the localization apparatus as a location point. The orientation controller is configured to control an orientation of the identification signal dependent upon an orientation of the localization apparatus in a defined environment.

The different illustrative embodiments further provide a method for localization. An identification signal is displayed on a localization apparatus for recognition by localized machine for utilizing the localization apparatus as a locating point. An orientation of the identification signal is controlled dependent upon an orientation of the localization apparatus in a defined environment.

The features, functions, and advantages can be achieved independently in various embodiments of the present invention, or may be combined in yet other embodiments, in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

DESCRIPTION OF THE PREFERRED EMBODIMENT

Figure 1:
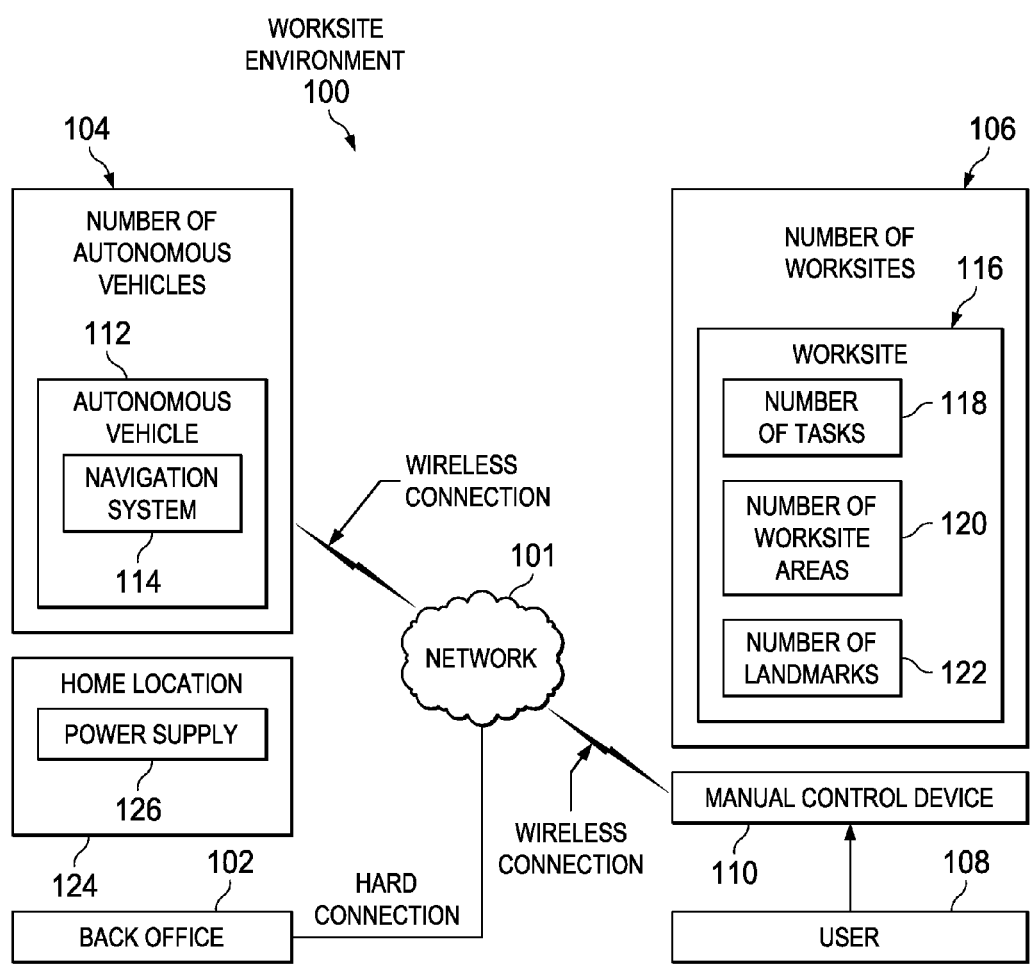
FIG. 1 is a block diagram of a worksite environment in which an illustrative embodiment may be implemented.

With reference to the figures and in particular with reference to FIG. 1, a block diagram of a worksite environment is depicted in which an illustrative embodiment may be implemented. Worksite environment 100 may be any type of worksite environment in which a localized machine can operate. A localized machine may be any type of machine with at least one function performed automatically based on a position of the machine. Functions include, but are not limited to, guidance, material application, and data collection. A localized machine may be, for example, without limitation, an autonomous vehicle. In an illustrative example, worksite environment 100 may be a structure, building, worksite, area, yard, golf course, indoor environment, outdoor environment, different area, change in the needs of a user, and/or any other suitable worksite environment or combination of worksite environments.

As an illustrative example, a change in the needs of a user may include, without limitation, a user moving from an old location to a new location and operating an autonomous vehicle in the yard of the new location, which is different than the yard of the old location. As another illustrative example, a different area may include, without limitation, operating an autonomous vehicle in both an indoor environment and an outdoor environment, or operating an autonomous vehicle in a front yard and a back yard, for example.

Worksite environment 100 includes network 101 in one embodiment of the present invention. In this example, back office 102 may be a single computer or a distributed computing cloud. Back office 102 supports the physical databases and/or connections to external databases which may be used in the different illustrative embodiments. Back office 102 may supply databases to different vehicles, as well as provide online access to information from databases. Back office 102 may also provide path plans for vehicles, such as number of autonomous vehicles 104, for example.

Worksite environment 100 may include number of autonomous vehicles 104, number of worksites 106, user 108, and manual control device 110. Number of autonomous vehicles 104 may be any type of autonomous vehicle including, without limitation, a mobile robotic machine, a service robot, a field robot, a robotic mower, a robotic snow removal machine, a robotic leaf removal machine, a robotic lawn watering machine, a robotic vacuum, and/or any other autonomous vehicle. Autonomous vehicle 112 may be an illustrative example of number of autonomous vehicles 104. Autonomous vehicle 112 includes navigation system 114. Autonomous vehicle 112 is a vehicle with at least one function performed automatically based on a position of the vehicle. Functions may include, for example, without limitation, guidance, material application, and data collection.

Navigation system 114 provides a system for controlling the mobility, positioning, and navigation for autonomous vehicle 112. System capabilities may include base behaviors such as, for example, without limitation, base mobility functions for effectuating random area coverage of a worksite, base obstacle avoidance functions for contact switch obstacle avoidance, base dead reckoning for positioning functions, and/or any other combination of basic functionality for autonomous vehicle 112. System capabilities may also include vision systems having a number of cameras used for landmark identification and localization within a worksite, such as number of worksites 106. Navigation system 114 may include path planning capabilities for navigating autonomous vehicle 112 within number of worksites 106 to perform area coverage tasks, for example.

Number of worksites 106 may be any area within worksite environment 100 in which number of autonomous vehicles 104 can operate. Each worksite in number of worksites 106 may be associated with a number of tasks. Worksite 116 is an illustrative example of one worksite in number of worksites 106. For example, in an illustrative embodiment, worksite 116 may be a back yard of a residence of a user. Worksite 116 includes number of tasks 118. In an illustrative example, number of tasks 118 may include mowing the back yard of the residence of a user. Number of autonomous vehicles 104 may operate to perform number of tasks 118 within worksite 116. As used herein, number refers to one or more items. In one illustrative example, number of worksites 106 may include, without limitation, a primary yard and a secondary yard. The primary yard may be worksite 116, associated with number of tasks 118. The secondary yard may be associated with another set of tasks, for example.

Each worksite in number of worksites 106 may include a number of worksite areas and a number of landmarks. Worksite 116 includes number of worksite areas 120 and number of landmarks 122. In an illustrative example, number of worksite areas 120 may be a number of locations within worksite 116, such as, for example, without limitation, a starting point, a midpoint, and an ending point. In another illustrative example, number of worksite areas 120 may include a sub-area of worksite 116.

Number of landmarks 122 may be any type of landmark capable of being detected by number of autonomous vehicles 104. In an illustrative example, number of landmarks 122 may include, without limitation, cylindrical landmarks, colored landmarks, patterned landmarks, illuminated landmarks, vertical landmarks, natural landmarks, any combination of the foregoing, and/or any other suitable landmark. Patterned landmarks may include a visual pattern incorporated to provide distinctive information, for example. Illuminated landmarks may provide visual detection in low-light or no-light situations, such as night time, for example. Natural landmarks may include, for example, without limitation, tree trunks. Other types of landmarks may include, for example, building architectural features, driveways, sidewalks, curbs, fences, and/or any other suitable landmarks.

User 108 may be, without limitation, a human operator, a robotic operator, or some other external system. Manual control device 110 may be any type of manual controller, which allows user 108 to override autonomous behaviors and control number of autonomous vehicles 104. In an illustrative example, user 108 may use manual control device 110 to control movement of number of autonomous vehicles 104 from home location 124 to worksite 116 in order to perform number of tasks 118.

Home location 124 may be a docking station or storage station for number of autonomous vehicles 104. Home location 124 may include power supply 126. Power supply 126 may provide power to number of autonomous vehicles 104 when number of autonomous vehicles 104 is at home location 124. In an illustrative example, power supply 126 may recharge a power store or power supply of number of autonomous vehicles 104. Power supply 126 may include, without limitation, a battery, mobile battery recharger, ultracapacitor, fuel cell, gas powered generator, photo cells, and/or any other suitable power source.

The illustration of worksite environment 100 in FIG. 1 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

The different illustrative embodiments recognize and take into account that currently used methods for robotic navigation often use a very primitive, random navigation system. This random navigation system works within a perimeter established by a wire carrying an electrical signal. The robotic machines in currently used methods may be equipped with an electrical signal detector and a bumper switch on the body of the machine. These machines move in a generally straight direction until they either detect the signal from the perimeter wire, or a bumper switch is closed due to contact of the machine with an external object. When either of these two situations occur, these machines change direction. In this way, current methods constrain the machine within a work area perimeter and maintain movement after contact with external objects.

The different illustrative embodiments further recognize and take into account that currently used systems for robotic navigation are fixed systems integrated into a robotic machine. These fixed systems may include advanced sensors for positioning and navigation, which allow for more efficient and precise coverage, but also increase the expense of the robotic machine by hundreds or thousands of dollars above the price of a robotic machine with basic, random navigation systems.

The different illustrative embodiments further recognize and take into account that currently used visual landmarks for robotic navigation may be ineffective in low-light or no-light situations, such as night time. Additionally, visual navigation systems incur sensitivity to angular error as distances from visual landmarks increase. A landmark which needs to be oriented to within tenths of a degree can be difficult and/or tedious to place, and may also be easily jarred out of calibration.

Thus, the different illustrative embodiments provide a localization apparatus comprising an identification signal and an orientation controller. The identification signal is for recognition by a localized machine for utilizing the localization apparatus as a location point. The orientation controller is configured to control an orientation of the identification signal dependent upon an orientation of the localization apparatus in a defined environment.

The different illustrative embodiments further provide a method for localization. An identification signal is displayed on a localization apparatus for recognition by localized machine for utilizing the localization apparatus as a locating point. An orientation of the identification signal is controlled dependent upon an orientation of the localization apparatus in a defined environment.

The different illustrative embodiments provide an enhanced visual landmark which can robustly provide a precise boundary for an autonomous vehicle worksite in a wide range of lighting conditions. Enhanced visibility of landmarks is provided for nighttime operation and boundary fault tolerance, while eliminating the need for buried wire boundaries.

Figure 2:
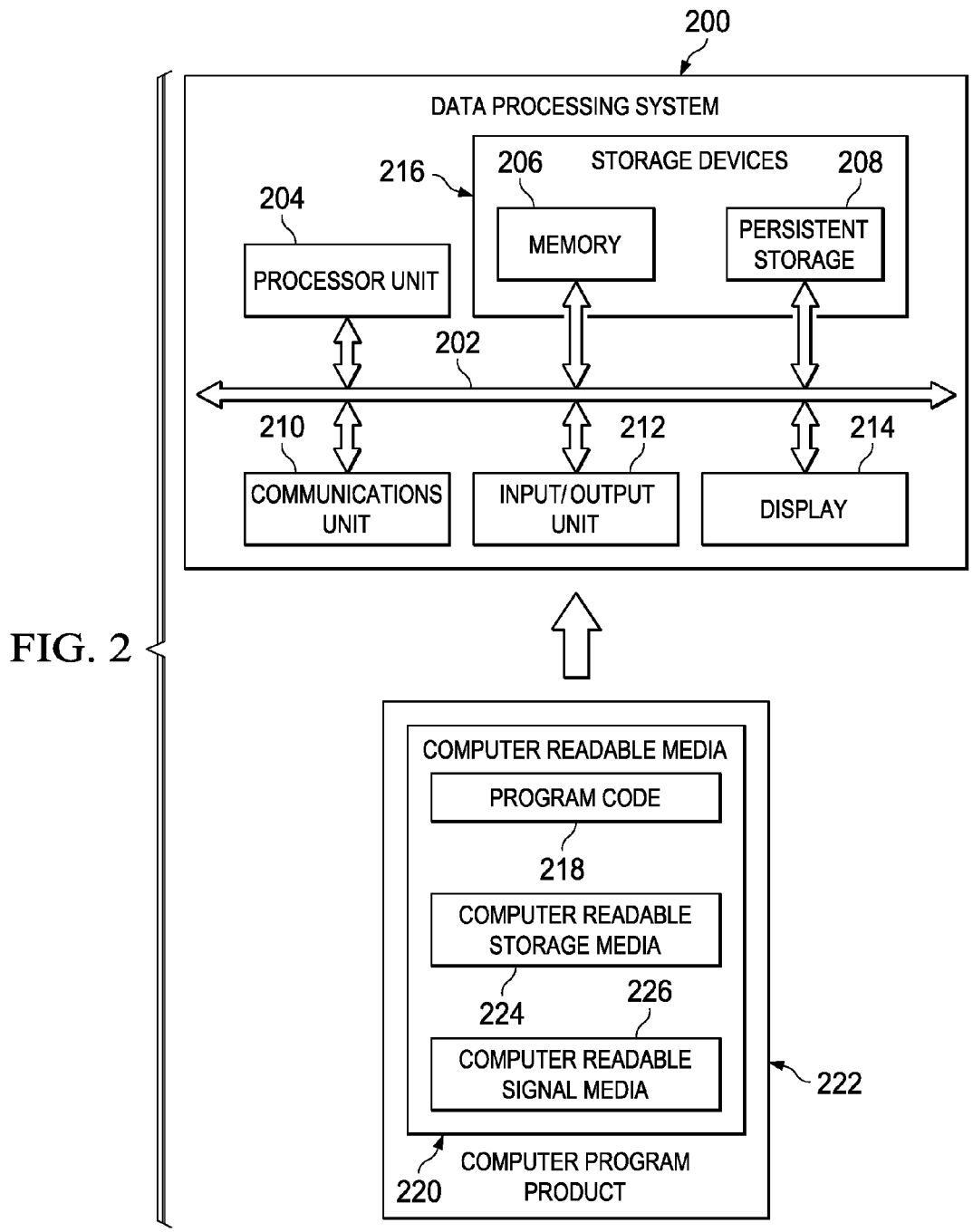
FIG. 2 is a block diagram of a data processing system in accordance with an illustrative embodiment.

With reference now to FIG. 2, a block diagram of a data processing system is depicted in accordance with an illustrative embodiment. Data processing system 200 is an example of a computer, such as back office 102 in FIG. 1, in which computer usable program code or instructions implementing the processes may be located for the illustrative embodiments.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

Figure 3:
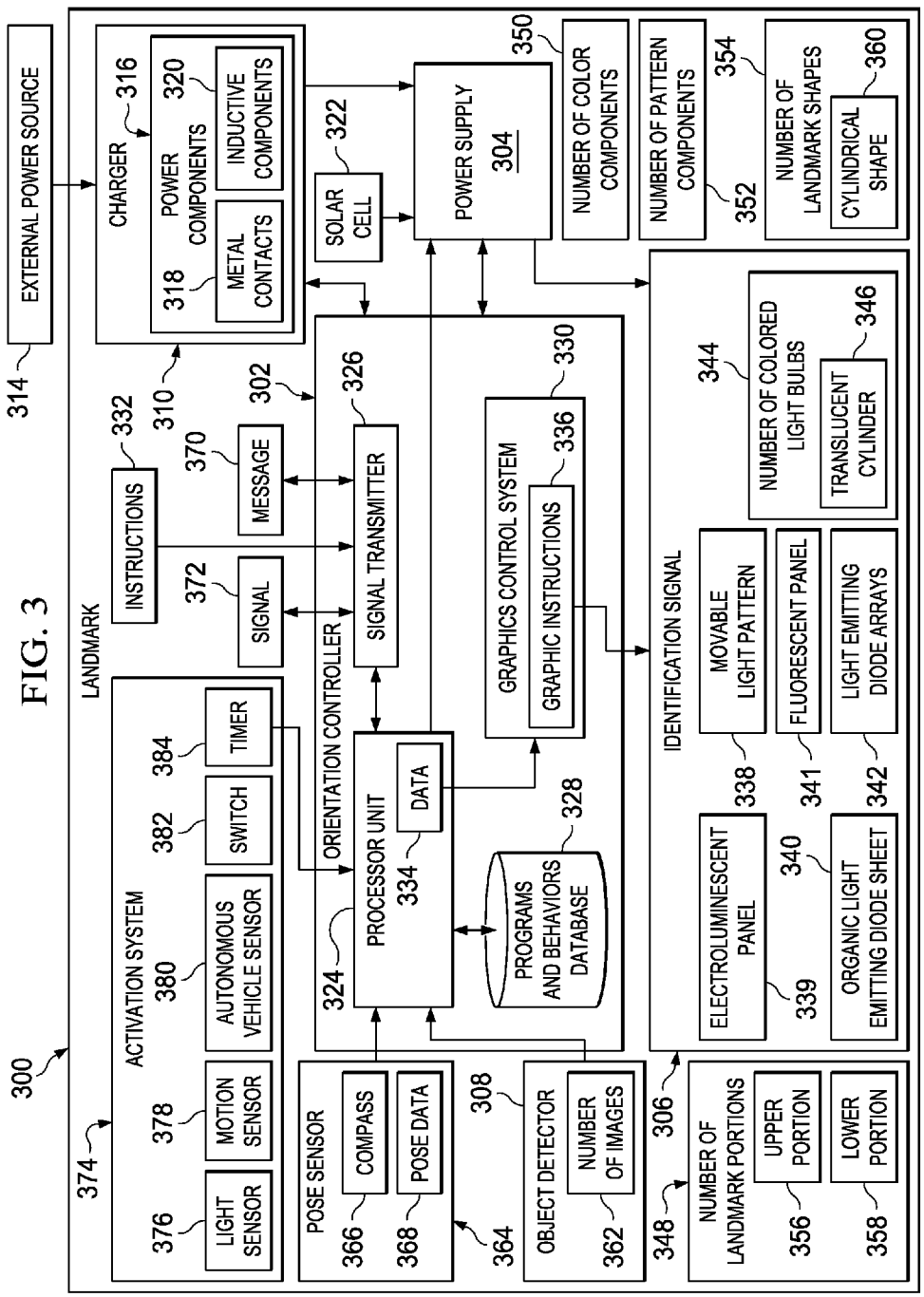
FIG. 3 is a block diagram of a landmark in accordance with an illustrative embodiment.

FIG. 3 is a block diagram of a landmark in accordance with an illustrative embodiment. Landmark 300 is an example of one implementation of number of landmarks 122 in FIG. 1.

Landmark 300 is controlled by orientation controller 302 and powered by power supply 304. Power supply 304 provides power to components of landmark 300, such as orientation controller 302, and identification signal 306. Power supply 304 may also provide power to optional components of landmark 300, such as object detector 308, for example. Power supply 304 may include, without limitation, a battery, mobile battery recharger, ultracapacitor, fuel cell, gas powered generator, photo cells, and/or any other suitable power source. Charger 310 monitors the level of power supply 304 and communicates the power supply level to orientation controller 302. Charger 310 provides recharging capabilities to power supply 304. In one illustrative example, charger 310 may send information about a low level of power in power supply 304. Orientation controller 302 may access programs and behaviors database 328 to employ a behavioral action in response to the indication of a low power level, in this illustrative example. For example, without limitation, a behavioral action may be to cease operation of a task and seek recharging in response to the detection of a low power level.

Charger 310 may receive power from external power source 314 via power components 316. Power components 316 may include, for example, without limitation, metal contacts 318, inductive components 320, and/or any other suitable components for receiving electrical power.

In one illustrative embodiment, charger 310 may be supplemented and/or replaced with solar cell 322. Solar cell 322 converts the energy of sunlight directly into electricity through the photovoltaic effect. The photovoltaic effect involves the creation of a voltage in a material in response to exposure to electro-magnetic radiation, generally sunlight. The generated electrons are transferred from one material to another resulting in the buildup of a voltage between two electrodes in solar cell 322.

Orientation controller 302 controls identification signal 306 to illuminate and/or provide visual data to autonomous vehicles in a worksite, such as number of autonomous vehicles 104 in FIG. 1. Orientation controller 302 may be implemented as a data processing system, such as data processing system 200 in FIG. 2, for example. Orientation controller 302 includes processor unit 324, signal transmitter 326, programs and behaviors database 328, and graphics control system 330.

Processor unit 324 may control the operation of identification signal 306 using instructions retrieved from programs and behaviors database 328. Processor unit 324 may also receive instructions 332 from an outside source, such as back office 102 and/or user 108 in FIG. 1, via communications unit 326, for example. Signal transmitter 326 is an illustrative example of one implementation of communications unit 210 in FIG. 2. Processor unit 324 generates data 334 to send to graphics control system 330 about instructions retrieved from programs and behaviors database 328 and/or instructions 332 received from an outside source.

Graphics control system 330 uses data 334 received from processor unit 324 to generate graphic instructions 336 for identification signal 306. Identification signal 306 may include a number of light emitting components, such as, for example, without limitation, moveable light pattern 338, electroluminescent panel 339, organic light emitting diode sheet 340, fluorescent panel 341, light emitting diode arrays 342, number of colored light bulbs 344, a transflective liquid crystal display, and/or any other suitable light emitting component.

Moveable light pattern 338 may be any shape and/or pattern of light emitted in a different color than the rest of the display of identification signal 306. In an illustrative example, in conjunction with organic light emitting diode sheet 340, moveable light pattern 338 may be displayed in one color of pixels while the remainder of organic light emitting diode sheet 340 is displayed in another color of pixels. The shape and/or pattern of moveable light pattern 338 may include, for example, without limitation, a vertical stripe, a diagonal stripe, a horizontal stripe, and/or any other suitable shape or pattern. Number of colored light bulbs 344 may be displayed in conjunction with translucent cylinder 346. As used herein, number refers to one or more colored light bulbs.

Landmark 300 may also include number of landmark portions 348, number of color components 350, number of pattern components 352, and number of landmark shapes 354. Number of landmark portions 348 may include, for example, upper portion 356 and lower portion 358. Number of color components 350 may be, for example, without limitation, a number of solid colored materials on the surface of landmark 300. Number of pattern components 352 may include, for example, without limitation, a number of patterned materials on the surface of landmark 300, such as a barcode for example. Number of landmark shapes 354 may include, for example, without limitation, cylindrical shape 360. In an illustrative example, lower portion 358 of landmark 300 may be implemented with number of color components 350, while upper portion 356 of landmark 300 is implemented with identification signal 306. Number of color components 350 may be used by number of autonomous vehicles 104 in FIG. 1 for landmark identification and localization during daytime, while identification signal 306 are used at nighttime, for example.

Object detector 308 may be optionally included in landmark 300. Object detector 308 may be, for example, a number of cameras. Object detector 308 may capture number of images 362 of a worksite, such as worksite 116 in FIG. 1. Object detector 308 may be used to monitor number of autonomous vehicles 104 in worksite 116, for example. Number of images 362 are sent to processor unit 324 of orientation controller 302. Processor unit 324 may use number of images 362 to generate data 334, for example. In this illustrative example, data 334 may include instructions for modifying and/or controlling identification signal 306 in response to specific observed actions by number of autonomous vehicles 104 in worksite 116 in FIG. 1, for example.

In an illustrative example, object detector 308 may monitor number of autonomous vehicles 104 in FIG. 1 and send message 370 via signal transmitter 326 to number of autonomous vehicles 104 when number of autonomous vehicles 104 reaches a worksite boundary. In another illustrative example, orientation controller 302 may transmit a continual signal 372 to number of autonomous vehicles 104 via signal transmitter 326, which may be necessary to maintain power of number of autonomous vehicles 104. When orientation controller 302 detects that number of autonomous vehicles 104 has moved outside a boundary using number of images 362, orientation controller 302 may stop signal 372, which would stop number of autonomous vehicles 104, in this example.

Signal 372 may also be used by number of autonomous vehicles 104 in FIG. 1 for relative signal strength localization to provide redundancy for the vision based localization of number of autonomous vehicles 104. In an illustrative embodiment, relative strengths of signal 372 from three or more landmarks 300 with known locations may be used to triangulate position of autonomous vehicle 112. In another illustrative embodiment, relative strength of signal 372 may provide autonomous vehicle 112 with a relative distance estimate between it and landmark 300.

Landmark 300 may also include pose sensor 364. Pose sensor 364 determines the pose of landmark 300 in a number of dimensions. The number of dimensions may include, for example, without limitation one dimension, two dimensions, and three dimensions. Pose sensor 364 may use compass 366 to determine the pose of landmark 300 relative to the local magnetic field, for example. Compass 366 may include a flux compass, for example. Pose sensor 364 may send pose data 368 to processor unit 324 of orientation controller 302. Signal transmitter 326 may also provide additional data to processor unit 324 to correct for differences between the local magnetic field direction detected by pose sensor 364 and true north. Pose data 368 may communicate the pose of landmark 300 to processor unit 324. The pose may be used by processor unit 324 to generate data 334 for graphics control system 330, for example. In this illustrative example, graphics control system 330 may use data 334 to generate graphic instructions 336 for displaying moveable light pattern 338 in a particular location relative to a local magnetic field for establishing a boundary.

Landmark 300 may also include activation system 374. Activation system 374 may send a signal to processor unit 324 of orientation controller 302 to activate landmark 300 based on a trigger or event, for example. Activation system 374 may include, for example, without limitation, light sensor 376, motion sensor 378, autonomous vehicle sensor 380, switch 382, timer 384, and/or any other suitable activation feature.

In one illustrative example, activation system 374 may send a signal to activate landmark 300 using light sensor 376 when light sensor 376 is unable to detect a given threshold of ambient light. In another illustrative example, motion sensor 378 may detect a change in speed or vector of an object or objects in the field of view, prompting activation of landmark 300. In yet another illustrative example, autonomous vehicle sensor 380 may detect autonomous vehicles, such as number of autonomous vehicles 104 in FIG. 1, within a given range of landmark 300, triggering activation of landmark 300 in this example. Autonomous vehicle sensor 380 may use a number of detection means including, for example, without limitation, visual detection, motion detection, radio frequency identification, and/or any other suitable means of detecting autonomous vehicles.

The illustration of landmark 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 4:
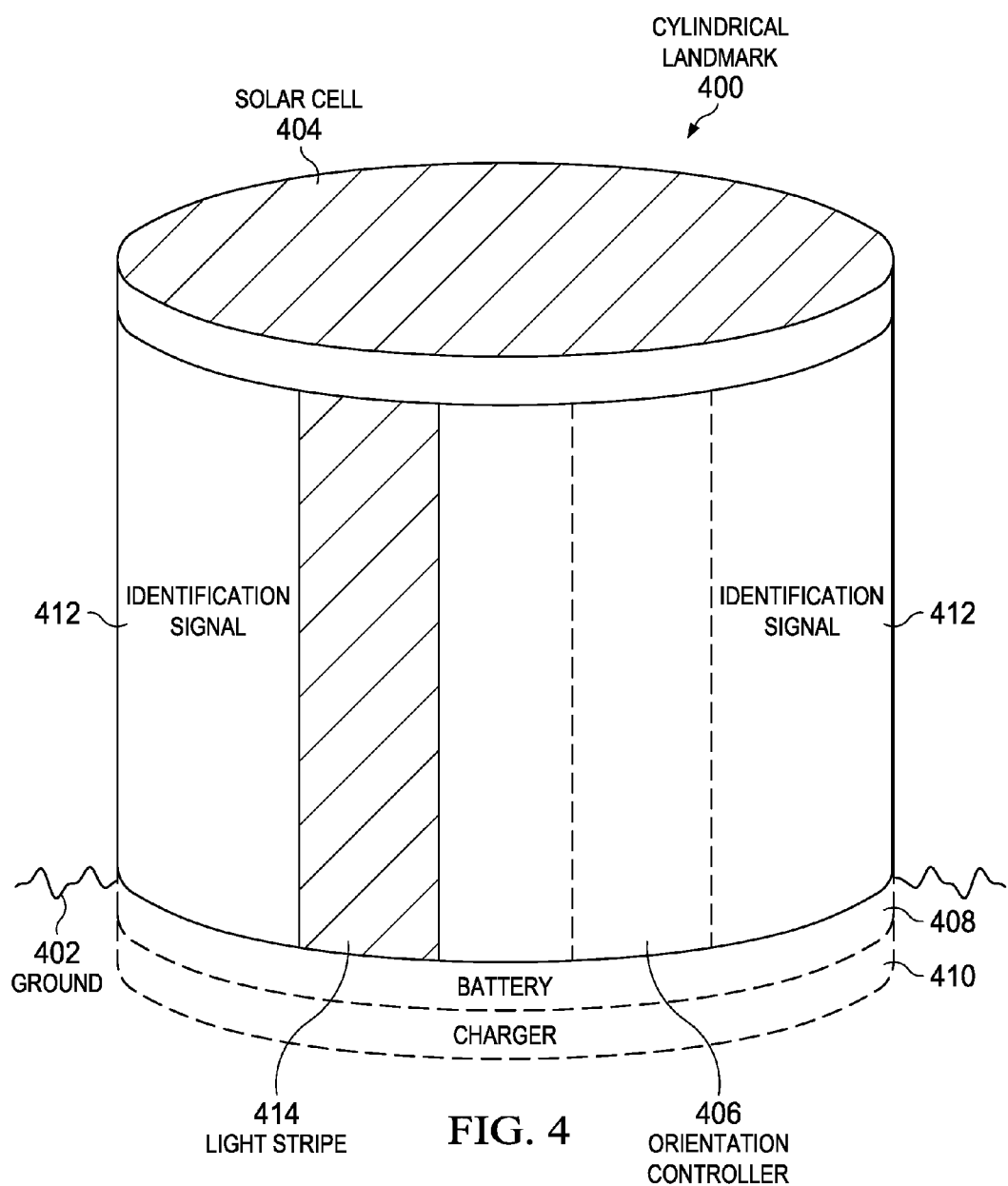
FIG. 4 is a block diagram of a cylindrical landmark in accordance with an illustrative embodiment.

FIG. 4 is a block diagram of a cylindrical landmark in accordance with an illustrative embodiment. Cylindrical landmark 400 is an example of one implementation of landmark 300 in FIG. 3.

Cylindrical landmark 400 may be positioned adjacent to ground 402, with portions of cylindrical landmark 400 below ground 402 and portions of cylindrical landmark 400 above ground 402. Cylindrical landmark 400 may include solar cell 404 positioned to absorb sunlight and convert sunlight to electrical energy provided to orientation controller 406. Orientation controller 406 may be internal to cylindrical landmark 400, in this example. Cylindrical landmark 400 may also include battery 408 and charger 410 to supplement solar cell 404. Battery 408 and charger 410 are illustrative examples of power supply 304 and charger 310 in FIG. 3.

Cylindrical landmark 400 includes identification signal 412 and light stripe 414. Identification signal 412 are implemented around the circumference of cylindrical landmark 400. Light stripe 414 is an illustrative example of one implementation of moveable light pattern 338 in FIG. 3. Light stripe 414 may be displayed using a different color or pattern than identification signal 412.

The illustration of cylindrical landmark 400 in FIG. 4 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in a preferred embodiment, identification signal 412 is in the visible light portion of the electromagnetic spectrum. Alternately, identification signal 412 may be a number of signals of any suitable frequencies of the electromagnetic spectrum. Alternately, identification signal 412 may be any suitable signal including, without limitation, acoustic signals.

Figure 5:
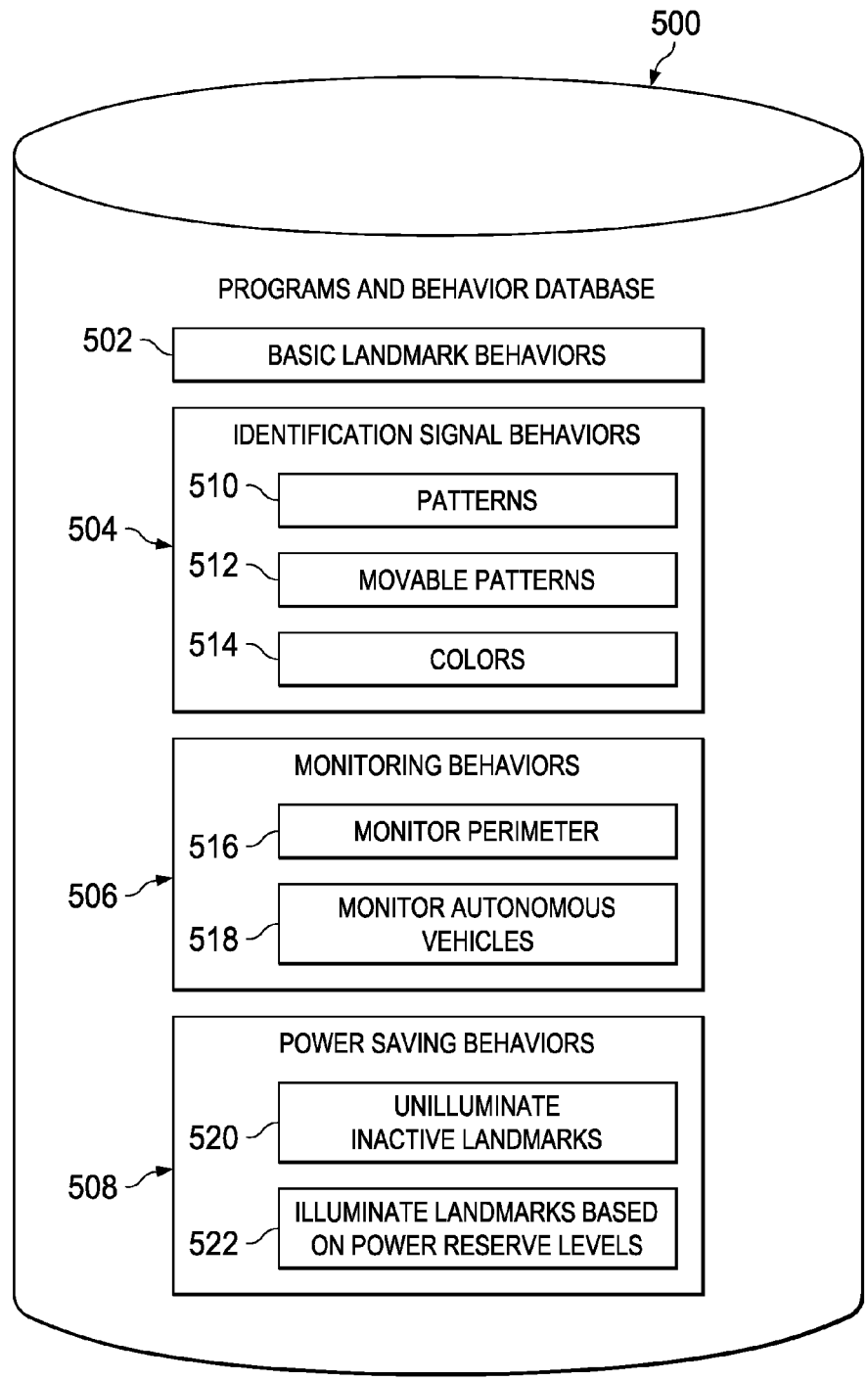
FIG. 5 is a block diagram of a programs and behavior database in accordance with an illustrative embodiment.

FIG. 5 is a block diagram of a programs and behavior database in accordance with an illustrative embodiment. Programs and behavior database 500 is an example of one implementation of programs and behaviors database 328 in FIG. 3.

Programs and behavior database 500 includes a number of behavioral actions processor unit 324 and graphics control system 330 of orientation controller 302 may utilize when controlling identification signal 306 in FIG. 3. Programs and behavior database 500 may include, without limitation, basic landmark behaviors 502, identification signal behaviors 504, monitoring behaviors 606, power saving behaviors 508, and/or any other suitable behaviors for landmark.

Basic landmark behaviors 502 provide actions for a number of basic tasks a visual landmark may perform. Basic landmark behaviors 502 may include, for example, without limitation, illumination.

Identification signal behaviors 504 provide actions for emitting light when performing basic landmark behaviors 502. Identification signal behaviors 504 may include, without limitation, patterns 510, moveable patterns 512, colors 514, and/or any other suitable light emitting behavior. Patterns 510 may include a pattern of light emission, such as pulsing, strobing, and/or selective illumination of light emitting components of a landmark, such as landmark 300, for example. Moveable patterns 512 may include differentiating a pattern or color of a portion of light emitting components from the rest of the light emitting components of a landmark. Colors 514 may include a number of different colors capable of being displayed using light emitting components of a landmark.

Monitoring behaviors 506 provide actions for an orientation controller to monitor a number of autonomous vehicles and/or a worksite, such as number of autonomous vehicles 104 or worksite 116 in FIG. 1. In an illustrative example, monitoring behaviors 506 may include, without limitation, monitor perimeter 516, monitor autonomous vehicles 518, and/or any other suitable behaviors. Monitoring behaviors 506 may include behaviors and instructions for an object detector used in conjunction with an orientation controller, such as object detector 308 in FIG. 3.

Power saving behaviors 508 provide actions for an orientation controller to take in response to a detected level of power in a power supply, such as power supply 304 in FIG. 3. In an illustrative example, power saving behaviors 508 may include, without limitation, un-illuminate inactive landmarks 520, illuminate landmarks based on power reserve levels 522, and/or any other suitable power saving behavior.

The illustration of programs and behavior database 500 in FIG. 5 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 6:
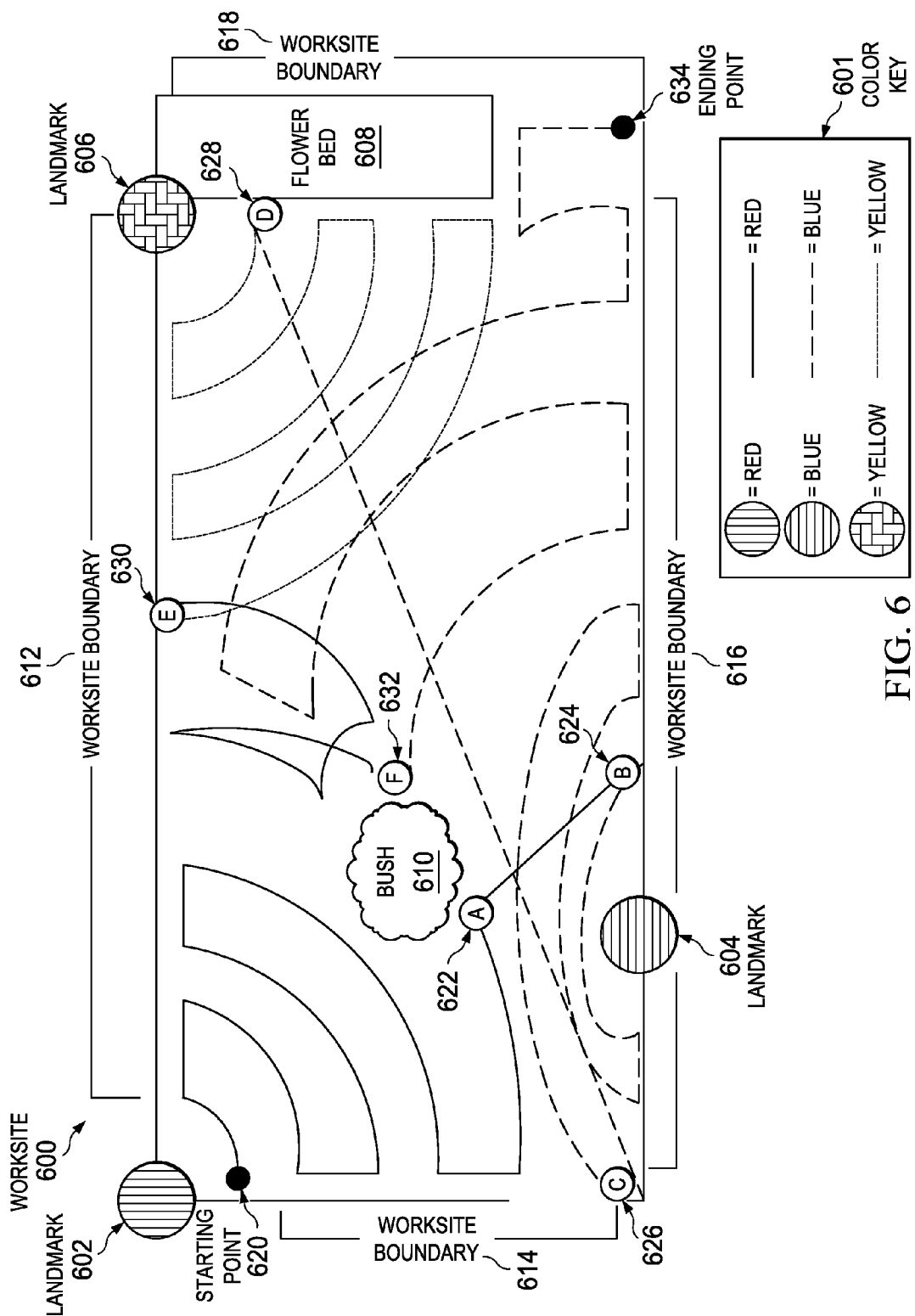
FIG. 6 is a block diagram of a worksite in accordance with an illustrative embodiment.

FIG. 6 is a block diagram of a worksite in accordance with an illustrative embodiment. Worksite 600 is an example of one implementation of worksite 116 in FIG. 1.

Worksite 600 includes landmark 602, landmark 604, and landmark 606. Landmark 602, landmark 604, and landmark 606 may be illustrative examples of one implementation of landmark 300 in FIG. 3. Worksite 600 also includes flower bed 608 and bush 610. In an illustrative example, flower bed 608 and bush 610 may be considered obstacles. Worksite 600 is defined by a perimeter on each side of the worksite, specifically worksite boundary 612, worksite boundary 614, worksite boundary 616, and worksite boundary 618.

Landmark 602, landmark 604, and landmark 606 may each be illuminated using light emitting components, such as identification signal 306 in FIG. 3. Each of landmark 602, landmark 604, and landmark 606 may also display a different color of illumination, as depicted in this illustrative example, according to color key 601. The different color of illumination may be used by an autonomous vehicle to distinguish between multiple landmarks, identify different tasks associated with different landmarks, provide decorative lighting, and/or any other number of distinctions.

An autonomous vehicle, such as autonomous vehicle 112 in FIG. 1, may execute a path plan for worksite 600 using landmark 602, landmark 604, and landmark 606 for localization and navigation during operation of an area coverage task, for example. Optionally, landmark 602, landmark 604, and landmark 606 may monitor autonomous vehicle 112 using an object detector, such as object detector 308 in FIG. 3, to provide fault tolerant boundaries for each of worksite boundary 612, worksite boundary 614, worksite boundary 616, and worksite boundary 618.

The path plan may begin with starting point 620. The autonomous vehicle proceeds from starting point 620 around landmark 602 until it reaches worksite boundary 612. The autonomous vehicle may maintain a predefined distance from landmark 602, creating an arc shaped path in this illustrative example. The predefined distance may be, for example, without limitation, a width of the autonomous vehicle for which the path plan is being generated. Upon reaching worksite boundary 612, the autonomous vehicle may employ vehicle behaviors to follow worksite boundary 612 away from landmark 602 for the predefined distance, in one illustrative example. In another illustrative example, landmark 602 may signal to the autonomous vehicle that worksite boundary 612 has been reached, causing the autonomous vehicle to employ vehicle behaviors to follow worksite boundary 612 away from landmark 602 for the predefined distance. The autonomous vehicle then proceeds back around landmark 602 until it reaches worksite boundary 614. The autonomous vehicle maintains the predefined distance from each preceding arc shaped path. Upon reaching a worksite boundary, the autonomous vehicle follows the worksite boundary the predefined distance away from the preceding arc shaped path before turning and proceeding back around the landmark, such as landmark 602.

The autonomous vehicle reaches an obstacle, in this example bush 610, at point A 622. The path is then made linear until the autonomous vehicle reaches worksite boundary 616 at point B 624. A next landmark is identified, in this example landmark 604. The autonomous vehicle proceeds around landmark 604, in concentric rings, until it reaches point C 626. The path is then made linear until the autonomous vehicle reaches an obstacle or a worksite boundary, in this example flower bed 608 at point D 628. Landmark 606 is identified and the autonomous vehicle proceeds around landmark 606 until it reaches point E 630. At point E 630, the autonomous vehicle again focuses on finishing a path around landmark 602 on the opposite side of bush 610, where it had previously left off to pursue a course around landmark 604. At point F 632, the autonomous vehicle again focuses on finishing a path around landmark 604, where it had previously left off upon encountering the perimeter where worksite boundary 614 and worksite boundary 616 met and proceeding linearly to point D 628. The autonomous vehicle continues in concentric rings around landmark 604 until it reaches the end and there are no additional landmarks to visit and no additional area to cover for the worksite.

The illustration of worksite 600 in FIG. 6 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 7:
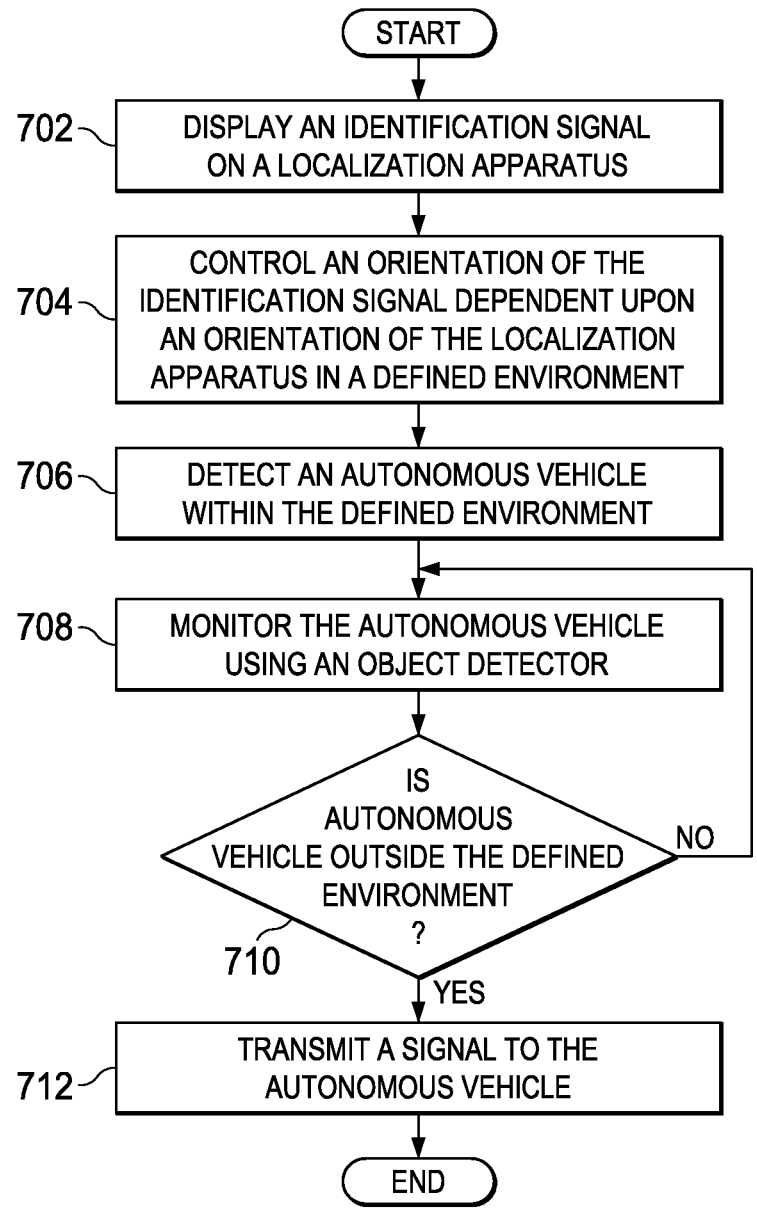
FIG. 7 is a flowchart illustration a process for localization in accordance with an illustrative embodiment.

With reference now to FIG. 7, a flowchart illustration a process for localization is depicted in accordance with an illustrative embodiment. The process in FIG. 7 may be implemented by a component such as orientation controller 302 in FIG. 3.

The process begins by displaying an identification signal on a localization apparatus (step 702). The identification signal may be recognized by an autonomous vehicle and used as a locating point, for example. The process controls an orientation of the identification signal dependent upon an orientation of the localization apparatus in a defined environment (step 704). A defined environment may refer to a worksite defined by one or more boundaries, for example.

The process detects an autonomous vehicle within the defined environment (step 706). The process monitors the autonomous vehicle using an object detector (step 708). The object detector may comprise a number of cameras configured to capture a number of images, for example, such as object detector 308 in FIG. 3. The process determines whether the autonomous vehicle is outside the defined environment (step 710).

If a determination is made that the autonomous vehicle is not outside the defined environment, the process returns to step 708. If a determination is made that the autonomous vehicle is outside the defined environment, the process transmits a signal to the autonomous vehicle (step 712), with the process terminating thereafter.

In one illustrative example, the signal transmitted may alert the autonomous vehicle that a worksite boundary has been reached. In another illustrative example, the process may transmit a continual signal to a number of autonomous vehicles via signal transmitter 326 in FIG. 3, which may be necessary to maintain power of number of autonomous vehicles. In this illustrative example, when the process detects that the number of autonomous vehicles has moved outside a boundary, the process may stop the continual signal, which would stop the number of autonomous vehicles 104, in this example.

In yet another illustrative example, a signal may also be used by a number of autonomous vehicles for relative signal strength localization to provide redundancy for the vision based localization of the number of autonomous vehicles.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A localization apparatus comprising:
   an identification signal for recognition by a localized machine for utilizing the localization apparatus as a location point; and
   an orientation controller configured to control an orientation of the identification signal dependent upon an orientation of the localization apparatus in a defined environment.

2. The localization apparatus of claim 1, wherein the identification signal includes at least one of an organic light emitting diode sheet, a light emitting diode array, a number of colored light bulbs, an electroluminescent panel, a fluorescent panel, and a transflective liquid crystal display.

3. The localization apparatus of claim 1, further comprising:
a number of portions having at least one of a number of color components, a number of pattern components, and a number of shapes.

4. The localization apparatus of claim 1, further comprising:
a moveable light pattern configured to display at least one of a different color and different pattern of light from the identification signal using the orientation controller.

5. The localization apparatus of claim 1, wherein the orientation controller further comprises:
a graphics control system configured to generate graphic instructions for the identification signal; and
a programs and behaviors database.

6. The localization apparatus of claim 1, further comprising:
an object detector for detecting the localized machine within the defined environment and outside of the defined environment.

7. The localization apparatus of claim 1, further comprising:
a signal transmitter for transmitting a signal to the localized machine when the localized machine leaves the defined environment.

8. The localization apparatus of claim 1, further comprising:
a pose sensor configured to detect a pose of the localization apparatus and send pose data to the orientation controller.

9. The localization apparatus of claim 8, wherein the pose is used to display a light pattern in a particular location relative to a local magnetic field for establishing a boundary.

10. The localization apparatus of claim 1, further comprising:
a power supply configured to provide power to the orientation controller and the identification signal.

11. A method for localization, the method comprising:
displaying an identification signal on a localization apparatus for recognition by a localized machine for utilizing the localization apparatus as a locating point; and
automatically controlling via a processor, an orientation of the identification signal dependent upon an orientation of the localization apparatus in a defined environment.

12. The method of claim 11, further comprising:
detecting the localized machine within the defined environment and outside of the defined environment.

13. The method of claim 11, further comprising:
transmitting a signal to the localized machine when the localized machine leaves the defined environment.

14. The method of claim 11, further comprising:
accessing a programs and behaviors database to control the displaying of the identification signal using instructions retrieved from the programs and behaviors database.

15. The localization apparatus of claim 5, wherein the programs and behaviors database is accessed by the orientation controller to employ a behavioral action in response to a detected condition regarding the localized machine.

16. The localization apparatus of claim 5, wherein the programs and behaviors database comprises at least one of behaviors of the identification signal, behaviors for monitoring the localized machine, and power saving behaviors.

\* \* \* \* \*